United States Patent
Shi et al.

(10) Patent No.: US 10,372,890 B2
(45) Date of Patent: Aug. 6, 2019

(54) APPARATUS AND METHOD FOR VERIFYING AN IDENTITY OF A USER

(71) Applicant: Lenovo (Beijing) Limited, Beijing (CN)

(72) Inventors: Xinyi Shi, Beijing (CN); Jianhua Song, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 15/087,425

(22) Filed: Mar. 31, 2016

(65) Prior Publication Data

US 2017/0177847 A1    Jun. 22, 2017

(30) Foreign Application Priority Data

Dec. 21, 2015   (CN) .......................... 2015 1 0966912

(51) Int. Cl.
   *G06F 21/32*   (2013.01)
   *G06K 9/00*    (2006.01)

(52) U.S. Cl.
   CPC ........... *G06F 21/32* (2013.01); *G06K 9/0008* (2013.01); *G06K 9/00013* (2013.01); *G06K 9/00067* (2013.01); *G06K 9/00892* (2013.01)

(58) Field of Classification Search
   CPC  G06F 21/32; G06K 9/00013; G06K 9/00067; G06K 9/0008; G06K 9/00892
   USPC .......................................................... 726/28
   See application file for complete search history.

(56) References Cited

U.S. PATENT DOCUMENTS

| | | | |
|---|---|---|---|
| 9,098,756 B2* | 8/2015 | Endoh | G06K 9/00013 |
| 2006/0265328 A1 | 11/2006 | Yasukura | |
| 2013/0129161 A1* | 5/2013 | Goel | G06F 21/32 382/124 |
| 2014/0283113 A1* | 9/2014 | Hanna | G06F 21/32 726/27 |

FOREIGN PATENT DOCUMENTS

| | | |
|---|---|---|
| CN | 101631023 A | 1/2010 |
| CN | 103678976 A | 3/2014 |
| CN | 104063644 A | 9/2014 |
| CN | 104751038 A | 7/2015 |
| CN | 105159583 A | 12/2015 |
| EP | 1981005 A2 | 10/2008 |

* cited by examiner

*Primary Examiner* — Ashokkumar B Patel
*Assistant Examiner* — William B Jones
(74) *Attorney, Agent, or Firm* — Kunzler Bean & Adamson

(57) ABSTRACT

The present disclosure discloses an apparatus, method, and electronic device. The apparatus includes a processor and a biometric sensor coupled to the processor. The biometric sensor is configured to detect a plurality of biometric features of a user. Each biometric feature may be associated with a value. The processor may determine a sequence of values from the biometric features. The processor may determine the sequence for comparison with a predetermined sequence of values to verify an identity of the user based, at least in part, on the comparison.

17 Claims, 5 Drawing Sheets

APPARATUS AND METHOD FOR VERIFYING AN IDENTITY OF A USER

FIELD

The subject matter disclosed herein relates to the field of electronic technologies, and in particular, to a biometrics device and method of verifying an identity of a user.

BACKGROUND

As science and technology develops, various electronic devices are updated continuously and functions of the electronic devices are increasingly enhanced. Passwords of electronic devices may include fingerprints or passwords of a combination of one or more of numbers, characters, or letters. However, during use, a password may be separated from a person and the password may be lost or revealed. Fingerprints may be stolen when the person loses consciousness.

SUMMARY

One embodiment of the disclosure includes an apparatus. The apparatus includes a processor. The apparatus includes a biometrics sensor coupled to the processor. The biometric sensor is configured to detect a plurality of biometrics features of a user. Each biometric feature is associated with a value. The processor determines a sequence of values from the biometric features as detected by the biometrics sensor for comparison with a predetermined sequence of values to verify an identity of the user based, at least in part, on the comparison.

One embodiment of the disclosure includes a method. The method includes detecting one or more biometric features of a user. The method includes determining a sequence of values from the detected biometric features. The method includes comparing the determined sequence of values with a predetermined sequence of values. The method includes verifying an identity of the user based, at least in part, on comparing the determined sequence of values with the predetermined sequence of values.

One embodiment of the disclosure includes an apparatus. The apparatus includes an electronic device. The electronic device may include a smart phone, a tablet computer, or a notebook computer. The apparatus includes a processor. The apparatus includes a biometrics sensor coupled to the processor. The biometric sensor is configured to detect a plurality of biometrics features of a user. Each biometric feature is associated with a value. The processor determines a sequence of values from the biometric features as detected by the biometrics sensor for comparison with a predetermined sequence of values to verify an identity of the user based, at least in part, on the comparison.

Some optional features of the apparatuses and optional steps of the method have been defined.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, embodiments will be described and explained with additional specificity and detail through the use of the accompanying drawings, in which.

DETAILED DESCRIPTION

To better understand the disclosure, the technical solution of the present disclosure is described in detail through the accompanying drawings and specific embodiments. It should be understood that the embodiments of the present application and specific features in the embodiment are detailed descriptions on the technical solution of the present disclosure, instead of limitation of the technical solution of the present disclosure, and the embodiments of the present application and the technical features in the embodiments may be combined together in a non-conflicting case.

Figure 7:
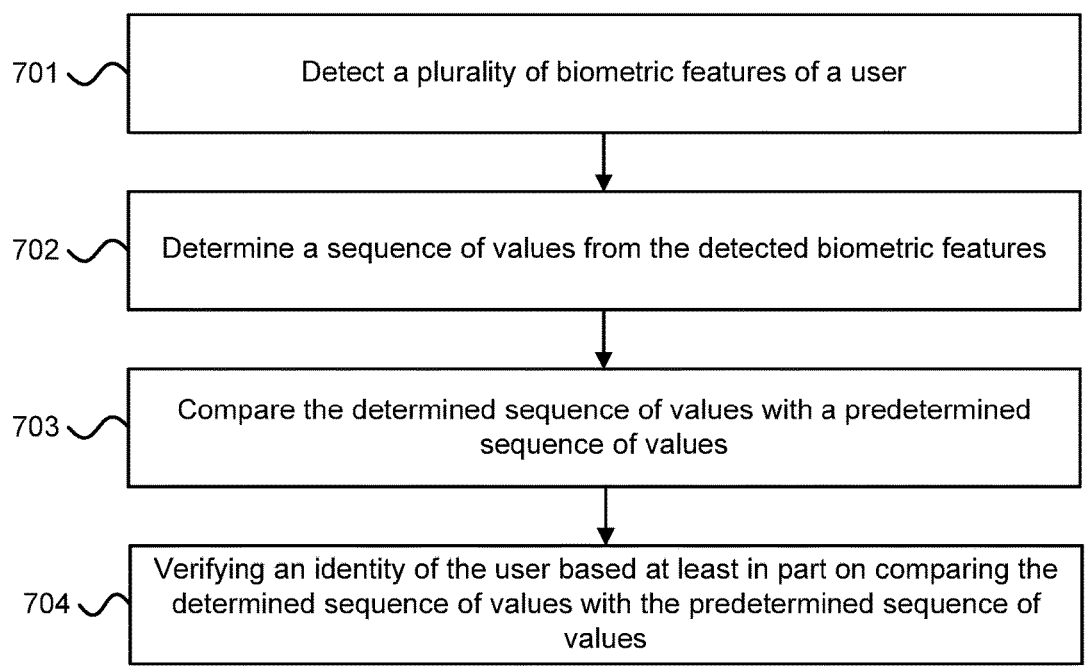
FIG. 7 is a flow chart of a further embodiment of a method for verifying an identity of a user.

FIG. 7 depicts one embodiment of a method for verifying an identity of a user. In one embodiment, the method includes detecting 71 a plurality of biometric features of a user. In the embodiment, a sensing region of an apparatus may include a sensing region having a texture recognition capability. For example, the sensing reason may include a region such as a fingerprint-sensing region on a touch screen of an electronic device or a key integrating a fingerprint detection function.

In one embodiment, detecting one or more biometric features of a user may include detecting a first operation that a user performs. The first operation may include an operation performed by a finger of a user of an electronic device or by a palm of the user on the sensing region. In one embodiment, the first operation may include a click operation, a press operation, a slide operation, or the like. The operation may include the sensing region detecting or collecting texture information of the user.

In one embodiment, the method may include determining 72 a sequence of values from the detected biometric features. Determining the sequence of values may include generating texture information based, at least in part, on one or more biometric features of the user. In one embodiment, a biometric feature may include a finger of the user, and the corresponding texture information may include texture information of a fingerprint. In one embodiment, a biometric feature may include a palm of the user and the corresponding texture information may include palm print information of the palm.

In one embodiment, the texture information may include the fingerprint information and a fingerprint collector of an electronic device may collect the fingerprint information of the finger of the user. In one embodiment, the fingerprint collector may include an optical fingerprint collector, a thermal sensor, a biological radio frequency fingerprint reader, or the like. In one embodiment, a sensing region of the electronic device may include a collection region used for collecting the fingerprint information. In one embodiment, the fingerprint collection region may include a triangle, parallelogram circle, or another shape.

In one embodiment, determining 72 the sequence of values from the detected biometric features may further include comparing the texture information with at least one of multiple pieces of predetermined texture information. Determining 72 the sequence of values from the detected biometric features may further include determining that the texture information matches predetermined texture information in response to the texture information matching first predetermined texture information in at least one piece of predetermined texture information.

In one embodiment, collected texture information may include the fingerprint information of the user. Multiple pieces of predetermined texture information may correspond to multiple pieces of fingerprint information of the user. For example, the collected texture information may include fingerprint information of different fingers of the user, different fingerprint information of different fingers of different persons, or the like. The fingerprint information may include information collected in advance by the fingerprint collector. In one embodiment, an apparatus, device (including an electronic device), a processor, or the like may store the multiple pieces of fingerprint information in an electronic device or a cloud server. The apparatus, device, processor, or the like may retrieve multiple pieces of fingerprint information from the cloud server.

In one embodiment, in response to collecting the fingerprint information, the method may include comparing collected fingerprint information to multiple fingerprint templates (for example, templates A1, A2, A3, A4) stored in the electronic device. In some embodiments, a comparison similarity may indicate a successful match in response to the similarity reaching a predetermined value. For example, in one embodiment, the similarity may include 80%, 85% or 90%, or the like. Persons of ordinary skill in the art may set the predetermined similarity value. For example, after matching, if the similarity of the collected fingerprint information A and a fingerprint template A3 is 90%, which is greater than a predetermined similarity threshold 85%, the method may determine that the collected fingerprint information A is the predetermined fingerprint information A3. In one embodiment, the method may collect multiple pieces of fingerprint information and compare them sequentially one at a time.

In a further embodiment, determining 72 the sequence of values from the detected biometric features includes acquiring a first feature value corresponding to the first predetermined texture information based on a predetermined mapping relationship in response to the texture information matching the first predetermined texture information.

In one embodiment, in response to determining that the collected texture information matches determined texture information, the method includes acquiring the feature value corresponding to the texture information. In one embodiment, the feature value corresponding to the texture information may include a number, a letter, a symbol or the like corresponding to the texture information, or may include other content.

In one embodiment, a predetermined mapping relationship may determine the feature value corresponding to the texture information. The predetermined mapping relationship may be predetermined and stored in and retrieved from an electronic device or in a cloud server. Table 1 shows one embodiment of a predetermined mapping relation as an example.

TABLE 1

| Fingerprint information | | Feature value |
|---|---|---|
| Left hand | Thumb | 0 |
| | Index finger | 1 |
| | Middle finger | 2 |
| | Ring finger | 3 |
| | Little finger | 4 |
| Right hand | Thumb | 5 |
| | Index finger | 6 |
| | Middle finger | 7 |
| | Ring finger | 8 |
| | Little finger | 9 |

In one embodiment for example, in response to the collected fingerprint information being the predetermined index finger and middle finger of the left hand and the thumb of the right hand, corresponding feature values thereof are respectively 1, 2 and 5.

Figure 1:
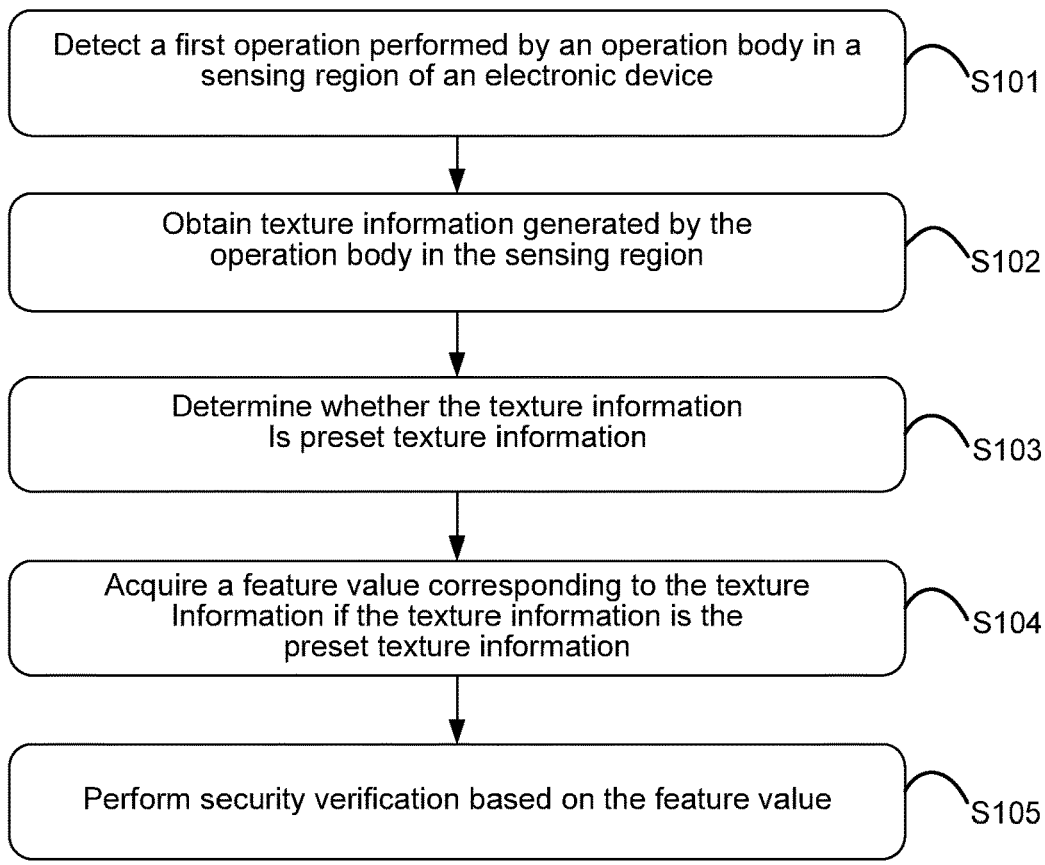
FIG. 1 is a flow chart of one embodiment of a method for verifying an identity of a user.
Figure 2:
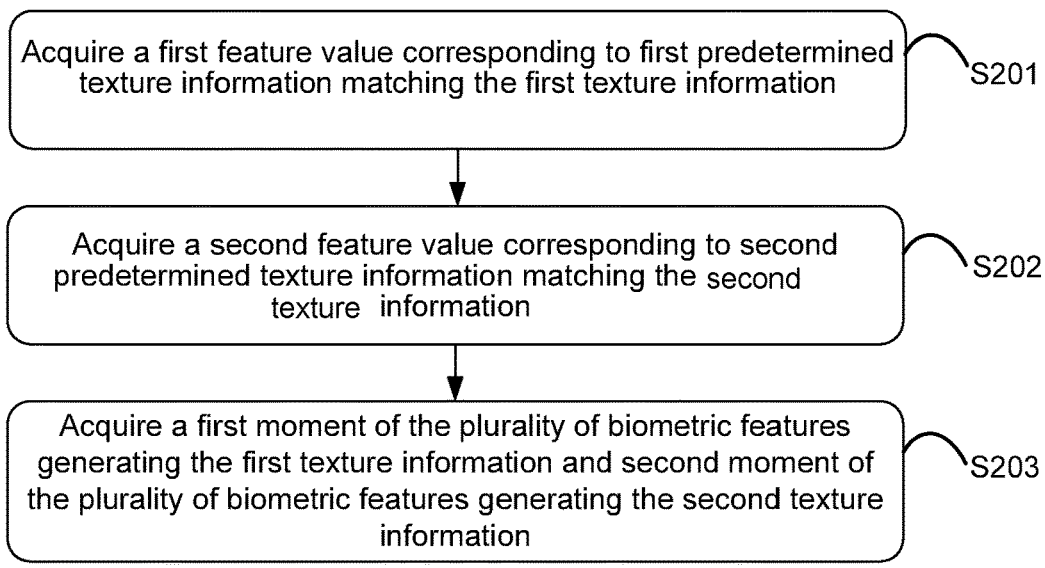
FIG. 2 is a flow chart of a further embodiment of a method for verifying an identity of a user.

In one embodiment, the texture information generated by one or more biometric features of the user may include first texture information and second texture information. Referring to FIG. 2, in one embodiment, determining 72 the sequence of values from the detected biometric features includes acquiring S201 a first feature value corresponding to first predetermined texture information matching the first texture information, acquiring 202 a second feature value corresponding to second predetermined texture information matching the second texture information, and acquiring S203 a first moment of the operation body generating the first texture information and a second moment of generating the second texture information.

In one embodiment, the method may include inputting multiple pieces of texture information. Inputting multiple pieces of texture information may enhance the complexity of the verification code and increase the security level of the verification code. In some embodiments, in response to inputting multiple pieces of texture information, the method may include generating multiple feature values. The multiple feature values may include feature values in addition to the first feature value corresponding to the first predetermined texture information matching the first texture information and the second feature value corresponding to the second predetermined texture information matching the second texture information, the first moment of the operation body generating the first texture information, and the second moment of generating the second texture information.

In one embodiment, the texture information may include the fingerprint information and Table 1 may include the mapping relationship. As an example, the method may include determining that the collected fingerprint information includes fingerprint information of the middle finger of the left hand and fingerprint information of the middle hand of the right hand of the user in the predetermined fingerprint information. The method may include determining that the first feature value corresponding to the fingerprint information of the middle finger of the left hand includes 2, a feature value corresponding to the fingerprint information of the middle finger of the right hand includes 7, and a clock in the electronic device may determine that the first moment of generating the first fingerprint information includes 8:01 and the second moment of generating the second fingerprint information includes 8:02. In one embodiment, the method may include determining that the first moment of generating the first fingerprint information includes 8:01 and the second moment of generating the second fingerprint information also includes 8:01.

In one embodiment, the first moment and the second moment may include different moments. Determining 72 the sequence of values from the detected biometric features may further include determining a sequence of generating the first texture information and the second texture information based on the first moment and the second moment, generating a character string based on the first feature value, the second feature value and the sequence, and using the character string for security verification.

In one embodiment for example, the first moment and the second moment may include different moments. The first moment may include 8:01 and the second moment may include 8:02. In response to acquiring the first moment and the second moment, the method may include sorting the acquired first texture information and the second texture information based on the first moment and the second moment.

In one embodiment for example, using Table 1, the acquired first texture information may include the fingerprint information of the middle finger of the left hand, the acquired second texture information may include the fingerprint information of the right hand. The first moment of generating the first texture information may include 8:01, and the second moment of generating the second texture information may include 8:02. In the preceding example, the first feature value corresponding to the fingerprint information of the middle finger of the left hand includes 2, the second feature value corresponding to the fingerprint information of the middle finger of the right hand includes 7, the generated character string includes 27, which may be used for subsequent security verification.

In one embodiment, the first feature value corresponding to the fingerprint information of the middle finger of the left hand may include A, the second feature value corresponding to the fingerprint information of the middle finger of the right hand may include 1, and the generated character string may include A1, which may be used for subsequent security verification.

In one embodiment, the first feature value corresponding to the fingerprint information of the middle finger of the left hand may include A, the second feature value corresponding to the fingerprint information of the middle finger of the right hand may include Y, and the generated character string includes AY, which may be used for subsequent security verification.

Figure 3:
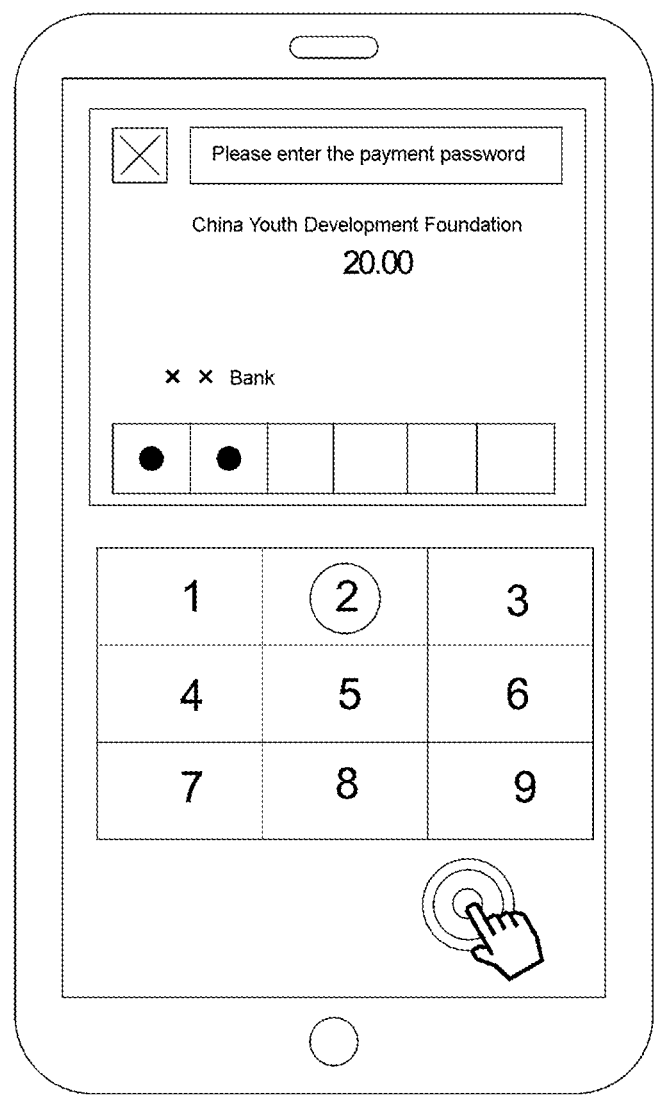
FIG. 3 is a schematic diagram of an interface for security verification provided in an embodiment of the present application.

FIG. 3 depicts one embodiment of an interface for security verification. In one embodiment, the first moment and the second moment may include the same moment. In one embodiment, determining 72 the sequence of values from the detected biometric features may include acquiring a first position of the first texture information in the sensing region of an apparatus, electronic device, or the like and a second position of the second texture information in the sensing region. The method may include determining an order of the first feature value and the second feature value based on the first position and the second position, generating a character string based on the first feature value, the second feature value and the order. The method may include using the character string for security verification.

In one embodiment, in response to the first moment and the second moment matching, determining 72 the sequence of values from the detected biometric features may further include acquiring a first position of the first texture information in a sensing region and a second position of the second texture information in the sensing region, determining an order of the first feature value and the second feature value based on the first position and the second position, generating a character string based on the first feature value, the second feature value, and the order, and using the character string for security verification.

In one embodiment, a collection region for collecting fingerprint information of the user on the sensing region of the electronic device may be divided into ten fingerprint collection regions. The regions may be numbered, for example 1 to 10 from left to right. In one embodiment, a user may input one or more biometric features into the one or more of the 10 fingerprint collection regions. The sensing region may determine, based at least in part, on a coordinate position of the sensing region. The coordinate position may determine the position of a collection region.

In one embodiment for example, the collected first texture information may include information of the middle finger of the left hand and the corresponding first feature value may include 2. The collected second texture information may include information of the middle finger of the right hand and the corresponding second feature value may include 7. In response to the number of the collection region corresponding to the first texture information including 2 and the number of the collection region corresponding to the second texture information including 7, the generated character string may include 27, which may be used for subsequent security verification.

In one embodiment for example, the collected first texture information may include information of the middle finger of the left hand and the corresponding first feature value may include A. The collected second texture information may include information of the middle finger of the right hand and the corresponding second feature value may include 1. In response to the number of the collection region corresponding to the first texture information including A and the number of the collection region corresponding to the second texture information including 1, the generated character string may include 1A, which may be used for subsequent security verification.

Figure 4:
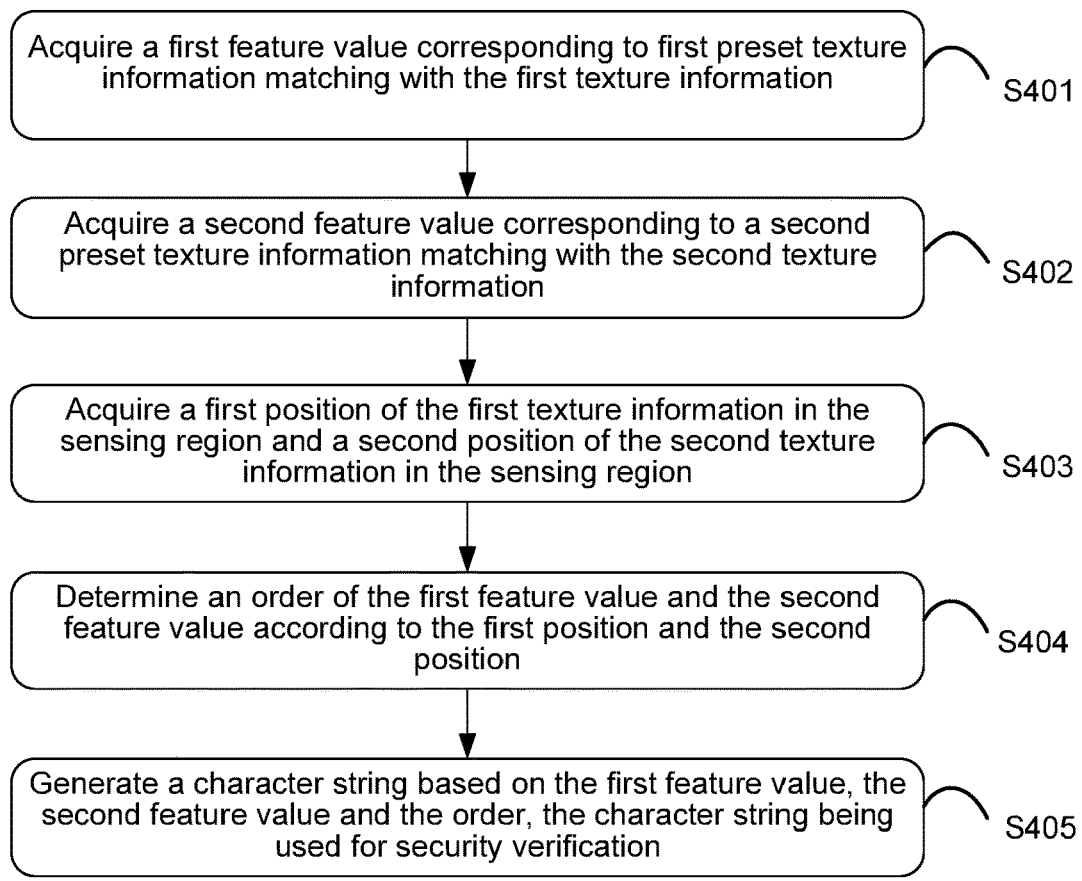
FIG. 4 is a flow chart of a further embodiment of a method for verifying an identity of a user.

Referring to FIG. 4, in one embodiment, texture information generated, at least in part, from at least one of the plurality of biometric features may include first texture information and second texture information. In response to determining that the first texture information and the second texture information match predetermined texture information, determining 72 the sequence of values from the detected biometric features includes acquiring S401 a first feature value corresponding to first predetermined texture information matching with the first texture information, acquiring S402 a second feature value corresponding to second predetermined texture information matching with the second texture information, acquiring S403 a first position of the first texture information in the sensing region and a second position of the second texture information in the sensing region, determining S404 an order of the first feature value and the second feature value based on the first position and the second position, generating S405 a character string based on the first feature value, the second feature value and the order, and using the character string for security verification.

In one embodiment, the method may further include sorting the feature values corresponding to the texture information based on the moments of generating the first texture information and the second texture information and based on the positions of the texture information on a sensing unit. The method may further include acquiring the first position of the first texture information in the sensing region and the second position of the second texture information in the sensing region. In one embodiment, a collection region for collecting fingerprint information of the user on the sensing region of the electronic device is divided into ten fingerprint collection regions. The regions may be numbered, for example as 1 to 10 from left to right. In response to a user inputting one or more biometric features into the sensing region, the method may further include determining the position of the texture information based on a coordinate position of one or more biometric features in the sensing region.

In one embodiment, the collected first texture information may include fingerprint information of the middle finger of the left hand and the corresponding first feature value may include 2. The collected second texture information may include fingerprint information of the index finger of the left hand and the corresponding second feature value may include 1. In response to the number of the collection region corresponding to the first texture information including 1 and the number of the collection region corresponding to the second texture information including 2, the generated character string may include 12, which may be used for subsequent security verification.

In one embodiment, the collected first texture information may include fingerprint information of the middle finger of the left hand and the corresponding first feature value may include A. The collected second texture information may include fingerprint information of the middle finger of the right hand and the corresponding second feature value may include 1. In response to the number of the collection region corresponding to the first texture information including A, the number of the collection region corresponding to the second texture information including 1, the generated character string may include A1, which may be used for subsequent security verification.

In the specific implementation process, to facilitate input, the sesing region may include multiple visual identifications. The divided fingerprint collection regions may correspond to the visual identifications. For example, a sun symbol may correspond to the fingerprint collection region numbered as 1, a pencil symbol may correspond to the fingerprint collection region numbered as 2, a flower symbol may correspond to the fingerprint collection region numbered as 3, and the like. In one embodiment, in response to the user inputting biometric information into the sensing region, the user may use corresponding visual icons. Moreover, a user may randomly drag the visual icons to change input regions in real time. The user dragging the icons may further increasing the security of password verification, and provide an enhanced experience to the user.

In one embodiment, the method may include comparing 73 the determined sequence of values with a predetermined sequence of values. In on embodiment, in response to the acquired texture information including one piece of texture information (for example, the fingerprint information of the index finger of the right hand of the user), the method may include determining the feature value. For example, the value corresponding to the fingerprint information of the index finger of the right hand may include the value 1. In one embodiment, the method includes acquiring a predetermined verification code. The method may check that the value determined from the detected biometric feature matches a predetermined verification code.

In one embodiment, comparing 73 the determined sequence of values with a predetermined sequence of values may include comparing the first texture information and the second texture information. For example, the first texture information may include the fingerprint information of the index finger and the second texture information may include the fingerprint information of the middle finger of the right hand of the user. The corresponding feature values may be, respectively, 6 and 7. In one embodiment, the method includes sorting the feature values based on moments of generating the fingerprint information or based on positions of the fingerprint information on the sensing unit, as discussed above. In one embodiment, the sorting may generate a character string, for example, 67, and the method may include matching the character string with a predetermined verification code.

In one embodiment, the method includes verifying 74 an identity of the user based, at least in part, on comparing the determined sequence of values with the predetermined sequence of values. In one embodiment, as described above, the determined sequence of values may match the predetermined sequence of values. The sequence of values matching the predetermined sequence of values may verify the identify of the user. In response to verifying the identity of the user, the user may gain access to an electronic device or the like.

Figure 5:
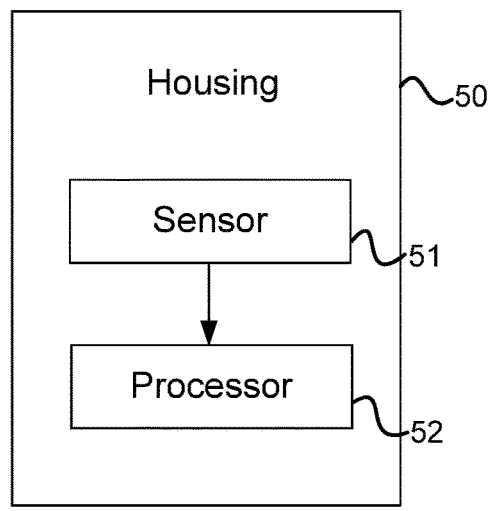
FIG. 5 is a structural diagram of an apparatus provided in an embodiment of the present application.

Referring to FIG. 5, one embodiment of the present disclosure provides an apparatus. The apparatus includes a processor 52, and a biometric sensor 51. The biometric sensor couples to the processor 52 and is configured to detect multiple biometrics features of a user. In one embodiment, each biometric feature is associated with a value and the processor 52 determines a sequence of values from the biometric features as detected by the biometric sensor 51 for comparison with a predetermined sequence of values to verify an identity of the user based, at least in part, on the comparison.

In one embodiment, the processor 52 is configured to generate texture information based, at least in part, one or more of the biometric features, compare the texture information with at least one of multiple pieces of predetermined texture information, and determine that the texture information matches predetermined texture information in response to the texture information matching first predetermined texture information in at least one predetermined texture information.

In one embodiment, the processor 52 is configured to acquire a first feature value corresponding to the first predetermined texture information based on a predetermined mapping relationship responsive to the processor 52 determining that texture information matches the first predetermined texture information.

In one embodiment, the generated texture information includes first texture information and second texture information. In one embodiment, in response to the first texture information and the second texture information matching the predetermined texture information, the processor 52 is configured to acquire a first feature value corresponding to first predetermined texture information matching the first texture information, acquire a second feature value corresponding to second predetermined texture information matching the second texture information, and acquire a first moment of the operation body generating the first texture information and a second moment of generating the second texture information. In some embodiments, the processor 52 is further configured to determine a sequence of generating the first texture information and the second texture information based on the first moment and the second moment, generate a character string based on the first feature value, the second feature value and the sequence, and use the character string for security verification.

In one embodiment, in response to the processor 52 determining that the first moment matches the second moment, the processor 52 is further configured to acquire a first position of the first texture information in the sensing region and a second position of the second texture information in the sensing region, determine an order of the first feature value and the second feature value based on the first position and the second position, generate a character string based on the first feature value, the second feature value and the order, and use the character string being used security verification.

In one embodiment, the generate texture information includes first texture information and second texture information. In response to the processor 52 determining that the first texture information and the second texture information comprise the predetermined texture information, the processor 52 is configured to acquire a first feature value corresponding to first predetermined texture information matching with the first texture information, acquire a second feature value corresponding to second predetermined texture information matching with the second texture information, acquire a first position of the first texture information in a sensing region and a second position of the second texture information in the sensing region, determine an order of the first feature value and the second feature value based on the first position and the second position, generate a character string based on the first feature value, the second feature value and the order, and use the character string for security verification.

Figure 6:
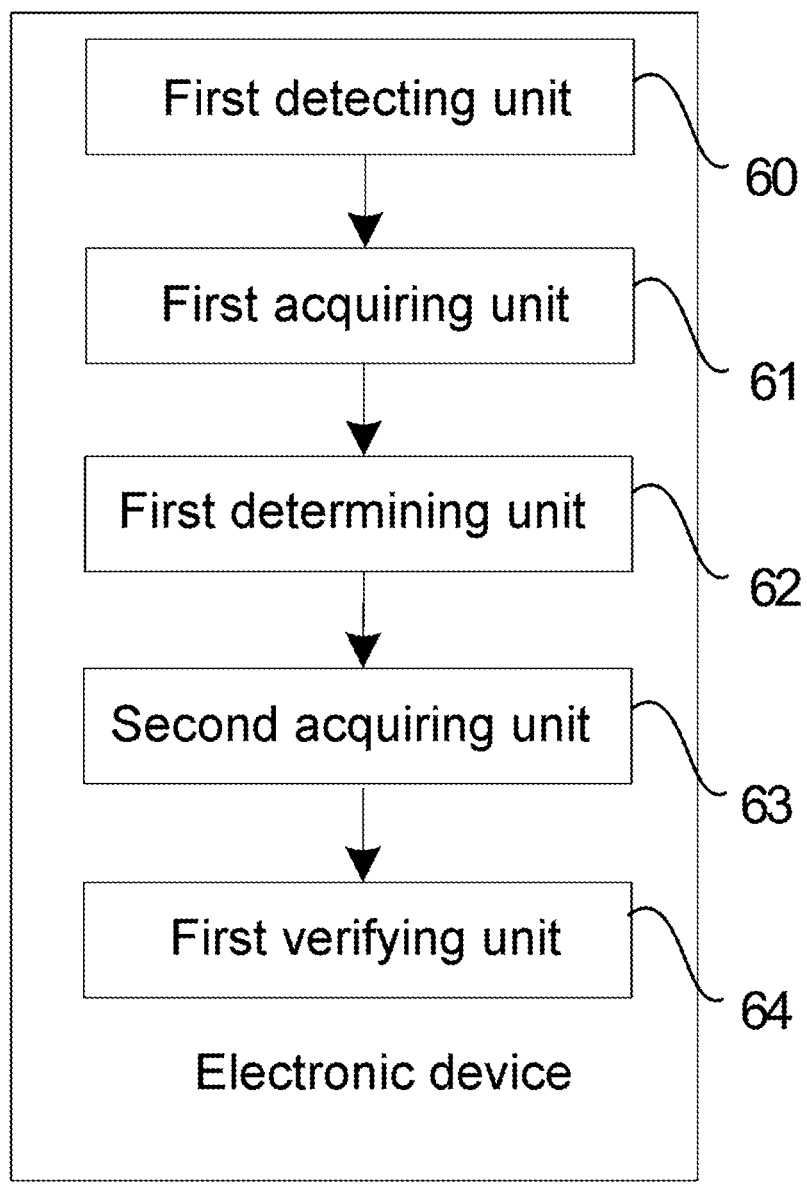
FIG. 6 is a structural diagram of an apparatus provided in an embodiment of the present application.

Referring to FIG. 6, one embodiment of the present application provides an electronic device. The electronic device includes a first detecting unit 60 configured to detect a first biometric feature of a user in a sensing region of an electronic device, a first acquiring unit 61 configured to obtain texture information generated by the first biometric feature in the sensing region, a first determining unit 62 configured to determine that the texture information is predetermined texture information, a second acquiring unit 63, configured to acquire a feature value corresponding to the texture information in response to the texture information matching the predetermined texture information, and a first verifying unit 64, configured to perform security verification based on the feature value.

In one embodiment, the first determining unit 62 includes a first comparing module configured to compare texture information generated by one or more biometric features with at least one of multiple pieces of predetermined texture information, and a first determining module configured to determine that the texture information matches predetermined texture information in response to the texture information matching first predetermined texture information in at least one piece of predetermined texture information.

In one embodiment, the second acquiring unit 63 includes a first acquiring module configured to acquire a first feature value corresponding to the first predetermined texture information based on a predetermined mapping relationship in response to the texture information matching the first predetermined texture information.

In one embodiment, the generated texture information generated includes first texture information and second texture information. In response to the first texture information and the second texture information matching predetermined texture information, the second acquiring unit 63 includes a second acquiring module configured to acquire a first feature value corresponding to first predetermined texture information matching the first texture information, a third acquiring module configured to acquire a second feature value corresponding to second predetermined texture information matching the second texture information, and a fourth acquiring module, configured to acquire a first moment of the operation body generating the first texture information and a second moment of generating the second texture information.

In one embodiment, the second acquiring unit 63 further includes a first determining module configured to determine a sequence of generating the first texture information and the second texture information based on the first moment and the second moment, a first generating module configured to generate a character string based on the first feature value the second feature value and the sequence, the first verifying unit 64 being configured to use the character string for security verification.

In one embodiment, in response to the first moment matching the second moment, the second acquiring unit 63 further includes a fifth acquiring module configured to acquire a first position of the first texture information in the sensing region and a second position of the second texture information in the sensing region, a second determining module, configured to determine an order of the first feature value and the second feature value based on the first position and the second position, and a second generating module, configured to generate a character string based on the first feature value, the second feature value and the order, the first verifying unit 64 being configured to use the character string for security verification.

In one embodiment, the generated texture information includes first texture information and second texture information. In response to the first texture information and the second texture information matching predetermined texture information, the second acquiring unit 63 includes a sixth acquiring module configured to acquire a first feature value corresponding to first predetermined texture information matching with the first texture information, a seventh acquiring module configured to acquire a second feature value corresponding to second predetermined texture information matching with the second texture information, an eighth acquiring module configured to acquire a first position of the first texture information in a sensing region and a second position of the second texture information in the sensing region, a third determining module configured to determine an order of the first feature value and the second feature value based on the first position and the second position, and a third generating module configured to generate a character string based on the first feature value, the second feature value and the order, the first verifying unit 64 being configured to use the character string for security verification.

In one embodiment of the disclosure, the embodiment includes an apparatus. The apparatus includes an electronic device. The electronic device may include a smart phone, a tablet computer, a notebook computer, or the like. The apparatus includes a processor. The apparatus includes a biometrics sensor coupled to the processor. The biometric sensor is configured to detect multiple biometrics features of a user. Each biometric feature is associated with a value. The processor determines a sequence of values from the biometric features as detected by the biometrics sensor for comparison with a predetermined sequence of values to verify an identity of the user based, at least in part, on the comparison.

In one embodiment, the processor may include a processor of one or more of the above embodiments. The biometric sensor may include a biometric sensor of one or more of the above embodiments.

In one embodiment, the processor may be configured to generate texture information based, at least in part, on at least one of the multiple biometric features, compare texture information with at least one of multiple pieces of predetermined texture information, and determine that the texture information matches predetermined texture information in response to the processor determining that the texture information matches first predetermined texture information of at least one piece of predetermined texture information.

In one embodiment, the processor may be configured to acquire a first feature value corresponding to the first predetermined texture information based on a predetermined mapping relationship in response to the processor determining that the texture information matches the first predetermined texture information.

In one embodiment, texture information generated, at least in part, from at least one of the plurality of biometric features may include first texture information and second texture information. In response to the processor determining that the first texture information and the second texture information match predetermined texture information, the processor may be configured to acquire a first feature value corresponding to first predetermined texture information matching the first texture information, acquire a second feature value corresponding to second predetermined texture information matching the second texture information, and acquire a first moment of the multiple biometric features generating the first texture information and a second moment of the plurality of biometric features generating the second texture information.

In one embodiment, the processor may be further configured to determine a sequence of generating the first texture information and the second texture information based on the first moment and the second moment, generate a character string based on the first feature value, the second feature value and the sequence, and use the character string security verification.

In one embodiment, the texture information generated, at least in part, from at least one of the plurality of biometric features includes first texture information and second texture information. In response the processor determining that the first texture information and the second texture information match predetermined texture information, the processor may be configured to acquire a first feature value corresponding to first predetermined texture information matching the first texture information, acquire a second feature value corresponding to second predetermined texture information matching the second texture information, acquiring a first position of the first texture information in a sensing region and a second position of the second texture information in the sensing region, determine an order of the first feature value and the second feature value based on the first position and the second position, generate a character string based on the first feature value, the second feature value and the order, and use the character string for security verification.

In some of the embodiments, texture information based on a user of an electronic device and a feature value corresponding to the texture information are used together as a verification password, which may increase the complexity of the verification password. In one embodiment, the combination of texture information and feature values may increase the security level of the verification and may increase the complexity of the verification password of the electronic device and avoiding leakage of user information.

In some embodiments, a to-be-verified character string is generated based on the sequence of generating the first and second texture information, the first feature value and the second feature value. In some embodiments, the complexity of the to-be-verified character string is high, which may increase the complexity of verification and may reduce the probability of leakage of user information.

In some embodiments, a processor, a biometric sensor, an apparatus, an electronic device, or the like may acquire the first and second feature values corresponding to the first and second texture information. The processor, biometric sensor, apparatus, electronic device, or the like may include one or more sensing regions where the first and second texture information are located and acquire the first and second texture information. The processor, biometric sensor, apparatus, electronic device, or the like may sort the first and second feature values based on sensing positions generate a to-be-verified password. The complexity of the to-be-verified password may be high, which may increase the complexity of verification and reduce the probability of leakage of user information.

Persons skilled in the art should understand that, the embodiments of the present disclosure may be provided as a method, a system, or a computer program product. The present disclosure may be implemented as a hardware embodiment, a software embodiment, or an embodiment combing software and hardware. Moreover, the present disclosure may include a computer program product implemented on one or more computer usable storage media (including a magnetic disk memory, a CD-ROM, an optical memory, and the like) includes computer usable program codes.

The present disclosure is described with reference to flow charts and/or block diagrams based on the method, device, system, and computer program product based on the embodiments of the present disclosure. It should be understood that a computer program instruction may be used to implement each process and/or block in the flow charts and/or block diagrams and combinations of processes and/or blocks in the flow charts and/or block diagrams. The computer program instructions may be provided to a universal computer, a dedicated computer, an embedded processor, or another programmable data processing device. The computer program instruction may generate a machine, such that the computer or a processor of another programmable data processing device executes an instruction to generate an apparatus configured to implement functions designated in one or more processes in a flow chart and/or one or more blocks in a block diagram.

The computer program instructions may also be stored in a computer readable storage working in a specific manner in a computer or another programmable data processing device. In one embodiment, the instruction stored in the computer readable storage generates a manufacture comprising an instruction apparatus. In some embodiments, the instruction apparatus implements functions designated by one or more processes in a flow chart and/or one or more blocks in a block diagram.

The computer program instructions may also be installed in a computer or another programmable data processing device. In one embodiment, a series of operation steps are executed on the computer or another programmable device to generate a computer implemented processing. In one embodiment, the instruction executed in the computer or another programmable device provides steps for implementing functions designated in one or more processes in a flow chart and/or one or more blocks in a block diagram.

In one embodiment, a computer program instruction in the embodiment of the present application can be stored in a storage medium such as an optical disc, a hard disk, or a USB flash drive. In one embodiment, the computer program instruction corresponding to a method in the storage medium is read or executed by an electronic device. In one embodiment, the computer program instruction includes detecting a plurality of biometric features of a user, determining a sequence of values from the detected biometric features, comparing the determined sequence of values with a predetermined sequence of values, and verifying an identity of the user based, at least in part, on comparing the determined sequence of values with the predetermined sequence of values.

In one embodiment, the computer program instruction may include generating texture information based, at least in part, on at least one of the multiple biometric features, comparing texture information with at least one of multiple pieces of predetermined texture information, and determining that the texture information matches predetermined texture information in response to determining that the texture information matches first predetermined texture information of at least one piece of predetermined texture information.

In one embodiment, the computer program instruction may include acquiring a first feature value corresponding to the first predetermined texture information based on a predetermined mapping relationship in response to determining that the texture information matches the first predetermined texture information.

In one embodiment, the computer program instruction may include texture information generated, at least in part, from at least one of the plurality of biometric features including first texture information and second texture information. In response to determining that the first texture information and the second texture information match predetermined texture information, the computer program instruction may include acquiring a first feature value corresponding to first predetermined texture information matching the first texture information, acquiring a second feature value corresponding to second predetermined texture information matching the second texture information, and acquiring a first moment of the multiple biometric features generating the first texture information and a second moment of the plurality of biometric features generating the second texture information.

In one embodiment, the computer program instruction may include determining a sequence of generating the first texture information and the second texture information based on the first moment and the second moment, generating a character string based on the first feature value, the second feature value and the sequence, and using the character string security verification.

In one embodiment, the texture information generated, at least in part, from at least one of the plurality of biometric features includes first texture information and second texture information. In response to the computer programming instruction determining that the first texture information and the second texture information match predetermined texture information, the computer program instruction may include acquiring a first feature value corresponding to first predetermined texture information matching the first texture information, acquiring a second feature value corresponding to second predetermined texture information matching the second texture information, acquiring a first position of the first texture information in a sensing region and a second position of the second texture information in the sensing region, determining an order of the first feature value and the second feature value based on the first position and the second position, generating a character string based on the first feature value, the second feature value and the order, and using the character string for security verification.

Preferred embodiments of the present disclosure have been described. Once knowing basic creative concepts, persons skilled in the art may make other variations and modifications on the embodiments. Persons skilled in the art can made various changes and variations on the present disclosure without departing from the spirit and scope of the present disclosure. The modifications and variations of the present disclosure are incorporated in the scope of the claims of the present disclosure and equivalent techniques, the present disclosure is also intended to incorporate the modifications and variations.

What is claimed is:

1. An apparatus, comprising:
   a processor; and
   a biometric sensor coupled to the processor, the biometric sensor being configured to detect a plurality of biometric features of a user,
   wherein the processor:
     detects or collects texture information via the biometric sensor for a first biometric feature and a second biometric feature;
     determines whether the first biometric feature of the plurality of biometric features of the user matches first predetermined information, wherein the first predetermined information is previously collected biometric information of a biometric feature of the user detected by the biometric sensor;
     determines whether the first biometric feature is received via a finger in a first coordinate position in a sensing region of a touch screen of the biometric sensor;
     in response to the first biometric feature matching the first predetermined information, determines a first identifier corresponding to the first biometric feature, wherein the first identifier is determined by selecting the first identifier from a mapping that maps biometric features to unique identifiers;
     determines whether the second biometric feature of the plurality of biometric features of the user matches second predetermined information, wherein the second predetermined information is previously collected biometric information of a biometric feature of the user detected by the biometric sensor;
     in response to the second biometric feature matching the second predetermined information, determines a second identifier corresponding to the second biometric feature, wherein the second identifier is determined by selecting the second identifier from the mapping that maps biometric features to unique identifiers;
     determines whether the second biometric feature is received via a finger in a second coordinate position in the sensing region of the touch screen of the biometric sensor; and
     determines a sequence of identifiers received sequentially one at a time comprising the first identifier and the second identifier, wherein the sequence of identifiers is determined by a moment the first biometric feature is acquired, a moment the second biometric feature is acquired, the first coordinate position, and the second coordinate position, and the sequence of identifiers received sequentially one at a time is compared with a predetermined sequence of identifiers to verify an identity of the user based, at least in part, on the comparison.

2. The apparatus of claim 1, wherein the processor is configured to:
   generate texture information based, at least in part, on at least one of the plurality of biometric features;

compare texture information with at least one of a plurality of pieces of predetermined texture information, and determine that the texture information matches predetermined texture information responsive to the processor determining that the texture information matches first predetermined texture information of at least one piece of predetermined texture information.

3. The apparatus of claim 1, wherein texture information generated, at least in part, from at least one of the plurality of biometric features comprises first texture information and second texture information, and wherein, responsive to the processor determining that the first texture information and the second texture information match predetermined texture information, the processor is configured to:

acquire the first identifier in response to first predetermined texture information matching the first texture information;

acquire the second identifier in response to second predetermined texture information matching the second texture information; and acquire a first moment of the plurality of biometric features generating the first texture information and a second moment of the plurality of biometric features generating the second texture information.

4. The apparatus of claim 3, wherein the processor is further configured to:

determine a sequence of generating the first texture information and the second texture information based on the first moment and the second moment;

generate a character string based on the first identifier, the second identifier and the sequence; and use the character string security verification.

5. The apparatus of claim 3, wherein, responsive to the processor determining that the first moment matches the second moment, the processor is further configured to:

determine an order of the first feature value and the second feature value based on the first position and the second position;

generate a character string based on the first identifier, the second identifier and the order; and use the character string for security verification.

6. The apparatus of claim 1, wherein texture information generated, at least in part, from at least one of the plurality of biometric features comprises first texture information and second texture information, and, responsive to the processor determining that the first texture information and the second texture information match predetermined texture information, the processor is configured to:

acquire the first identifier in response to first predetermined texture information matching the first texture information;

acquire the second identifier in response to second predetermined texture information matching the second texture information;

generate a character string based on the first identifier, the second identifier and the order; and use the character string for security verification.

7. A method comprising:

detecting or collecting texture information via a biometric sensor for a plurality of biometric features of a user;

determining whether a first biometric feature of the plurality of biometric features of the user matches first predetermined information, wherein the first predetermined information is previously collected biometric information of a biometric feature of a user detected by the biometric sensor;

determining whether the first biometric feature is received via a finger in a first coordinate position in a sensing region of a touch screen of the biometric sensor;

in response to the first biometric feature matching the first predetermined information, determining a first identifier corresponding to the first biometric feature, wherein the first identifier is determined by selecting the first identifier from a mapping that maps biometric features to unique identifiers;

determining whether a second biometric feature of the plurality of biometric features of the user matches second predetermined information, wherein the second predetermined information is previously collected biometric information of a biometric feature of the user detected by the biometric sensor;

in response to the second biometric feature matching the second predetermined information, determining a second identifier corresponding to the second biometric feature, wherein the second identifier is determined by selecting the second identifier from the mapping that maps biometric features to unique identifiers;

determining whether the second biometric feature is received via a finger in a second coordinate position in the sensing region of the touch screen of the biometric sensor;

determining a sequence of identifiers received sequentially one at a time comprising the first identifier and the second identifier, wherein the sequence of identifiers is determined by a moment the first biometric feature is acquired, a moment the second biometric feature is acquired, the first coordinate position, and the second coordinate position;

comparing the sequence of identifiers received sequentially one at a time with a predetermined sequence of identifiers; and verifying an identity of the user based, at least in part, on comparing the sequence of identifiers with the predetermined sequence of identifiers.

8. The method of claim 7, wherein determining the sequence of identifiers from the detected biometric features comprises:

generating texture information based, at least in part, on at least one of the plurality of biometric features;

comparing the texture information with at least one of a plurality of pieces of predetermined texture information; and determining that the texture information matches the predetermined texture information responsive to determining that the texture information matches first predetermined texture information of at least one piece of predetermined texture information.

9. The method of claim 7, wherein texture information generated, at least in part, from at least one of the plurality of biometric features comprises first texture information and second texture information, and wherein, responsive to determining that the first texture information and the second texture information match predetermined texture information, and wherein determining the sequence of indicators from the detected biometric features comprises:

acquiring the first identifier in response to first predetermined texture information matching the first texture information;

acquiring the second identifier in response to second predetermined texture information matching the second texture information; and acquiring a first moment of the plurality of biometric features generating the first texture information and a second moment of the plurality of biometric features generating the second texture information.

10. The method of claim 9, wherein determining the sequence of identifiers from the detected biometric features further comprises:
   determining a sequence of generating the first texture information and the second texture information based on the first moment and the second moment;
   generating a character string based on the first identifier, the second identifier and the sequence; and
   using the character string for security verification.

11. The method of claim 9, wherein, responsive to determining that the first moment matches the second moment, determining the sequence of indicators from the detected biometric features further comprises:
   generating a character string based on the first identifier, the second identifier and the order; and
   using the character string for security verification.

12. The method of claim 7, wherein texture information generated, at least in part, from at least one of the plurality of biometric features of the user comprises first texture information and second texture information, and wherein, responsive to determining that the first texture information and the second texture information match predetermined texture information, determining the sequence of identifiers from the detected biometric features comprises:
   acquiring the first identifier in response to first predetermined texture information matching the first texture information;
   acquiring the second identifier in response to second predetermined texture information matching the second texture information;
   generating a character string based on the first identifier, the second identifier and the order; and
   using the character string for security verification.

13. An apparatus comprising:
   an electronic device having a processor; and
   a biometrics sensor coupled to the processor, the biometric sensor being configured to detect a plurality of biometrics features of a user,
   wherein the processor:
      detects or collects texture information via the biometric sensor for a first biometric feature and a second biometric feature;
      determines whether the first biometric feature of the plurality of biometric features of the user matches first predetermined information, wherein the first predetermined information is previously collected biometric information of a biometric feature of a user detected by the biometric sensor;
      determines whether the first biometric feature is received via a finger in a first coordinate position in a sensing region of a touch screen of the biometric sensor;
      in response to the first biometric feature matching the first predetermined information, determines a first identifier corresponding to the first biometric feature, wherein the first identifier is determined by selecting the first identifier from a mapping that maps biometric features to unique identifiers;
      determines whether the second biometric feature of the plurality of biometric features of the user matches second predetermined information, wherein the second predetermined information is previously collected biometric information of a biometric feature of the user detected by the biometric sensor;
      in response to the second biometric feature matching the second predetermined information, determines a second identifier corresponding to the second biometric feature, wherein the second identifier is determined by selecting the second identifier from the mapping that maps biometric features to unique identifiers;
      determines whether the second biometric feature is received via a finger in a second coordinate position in the sensing region of the touch screen of the biometric sensor; and
      determines a sequence of identifiers received sequentially one at a time comprising the first identifier and the second identifier, wherein the sequence of identifiers is determined by a moment the first biometric feature is acquired, a moment the second biometric feature is acquired, the first coordinate position, and the second coordinate position, and the sequence of identifiers received sequentially one at a time is compared with a predetermined sequence of identifiers to verify an identity of the user based, at least in part, on the comparison.

14. The apparatus of claim 13, wherein the electronic device is selected from a group consisting of:
   a smart phone;
   a tablet computer; and
   a notebook computer.

15. The apparatus of claim 13, wherein the processor is configured to:
   generate texture information based, at least in part, on at least one of the plurality of biometric features;
   compare texture information with at least one of a plurality of pieces of predetermined texture information, and
   determine that the texture information matches predetermined texture information responsive to the processor determining that the texture information matches first predetermined texture information of at least one piece of predetermined texture information.

16. The apparatus of claim 13, wherein texture information generated, at least in part, from at least one of the plurality of biometric features comprises first texture information and second texture information, and wherein, responsive to the processor determining that the first texture information and the second texture information match predetermined texture information, the processor is configured to:
   acquire the first identifier in response to first predetermined texture information matching the first texture information;
   acquire the second identifier in response to second predetermined texture information matching the second texture information; and
   acquire a first moment of the plurality of biometric features generating the first texture information and a second moment of the plurality of biometric features generating the second texture information.

17. The apparatus of claim 16, wherein the processor is further configured to:
   determine a sequence of generating the first texture information and the second texture information based on the first moment and the second moment;
   generate a character string based on the first identifier, the second identifier and the sequence; and
   use the character string security verification.

* * * * *